United States Patent
Tong et al.

(10) Patent No.: US 10,396,409 B2
(45) Date of Patent: Aug. 27, 2019

(54) HEAT SINK AND POWER BATTERY SYSTEM

(71) Applicant: BYD COMPANY LIMITED, Shenzhen, Guangdong (CN)

(72) Inventors: Zhiwei Tong, Shenzhen (CN); Qing Lai, Shenzhen (CN); Jianhua Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 174 days.

(21) Appl. No.: 15/499,503

(22) Filed: Apr. 27, 2017

(65) Prior Publication Data

US 2017/0294693 A1    Oct. 12, 2017

Related U.S. Application Data (63) Continuation of application No. PCT/CN2015/091856, filed on Oct. 13, 2015.

(30) Foreign Application Priority Data

Oct. 31, 2014 (CN) .................. 2014 2 0645806 U (51) Int. Cl.
*H01M 10/00*     (2006.01)
*H01M 10/613*    (2014.01)
*H01M 10/6563*   (2014.01)
*H01M 10/6556*   (2014.01)
*H01M 10/653*    (2014.01)

(Continued)

(52) U.S. Cl.
CPC ....... *H01M 10/613* (2015.04); *H01M 2/1077* (2013.01); *H01M 10/653* (2015.04); *H01M 10/6551* (2015.04); *H01M 10/6556* (2015.04); *H01M 10/6563* (2015.04)

(58) Field of Classification Search
CPC ............ H01M 10/613; H01M 10/653; H01M 10/6556; H01M 2/1077; H01M 10/6563; H01M 10/6551
See application file for complete search history.

(56) References Cited

U.S. PATENT DOCUMENTS 1,864,751 A    6/1932   Muir
5,937,517 A    8/1999   Smith et al.
(Continued)

FOREIGN PATENT DOCUMENTS

CN    2507055 A    8/2002
CN    1665021 A    9/2005
(Continued)

OTHER PUBLICATIONS

International Search Report and Written Opinion for Application No. PCT/CN2015/091856, dated Jan. 13, 2016, 12 pages.

*Primary Examiner* — Cynthia H Kelly
*Assistant Examiner* — Monique M Wills (57) ABSTRACT

A heat sink and power battery system are provided. The heat sink includes a heat dissipation plate and a cover plate. The heat dissipation plate includes a bottom plate and a plurality of fins arranged on the bottom plate in a comb-like pattern. The cover plate is fixedly connected to the heat dissipation plate. The fins of the heat dissipation plate are disposed between the bottom plate and the cover plate, and an air duct is formed among the bottom plate, the fins, and the cover plate.

20 Claims, 9 Drawing Sheets

(51) Int. Cl.
*H01M 10/6551* (2014.01)
*H01M 2/10* (2006.01)

(56) References Cited

U.S. PATENT DOCUMENTS

| | | | |
|---|---|---|---|
| 6,540,015 B1 * | 4/2003 | Kawachi | F28D 7/0025 165/140 |
| 2005/0072563 A1 | 4/2005 | Wang et al. | |
| 2006/0157858 A1 * | 7/2006 | Furman | H01L 23/473 257/762 |
| 2006/0216582 A1 | 9/2006 | Lee et al. | |
| 2010/0252241 A1 * | 10/2010 | McDermott | C23C 28/042 165/151 |
| 2010/0263850 A1 * | 10/2010 | Huang | F28F 3/02 165/185 |
| 2011/0168374 A1 * | 7/2011 | Watanabe | H01L 21/4882 165/185 |
| 2012/0244404 A1 | 9/2012 | Obasih et al. | |
| 2013/0273829 A1 | 10/2013 | Obasih et al. | |
| 2015/0076685 A1 | 3/2015 | Abe et al. | |
| 2016/0054069 A1 * | 2/2016 | Armsden | F28D 7/0066 165/173 |

FOREIGN PATENT DOCUMENTS

| | | |
|---|---|---|
| CN | 201285784 Y | 8/2009 |
| CN | 202308222 U | 7/2012 |
| CN | 102792512 A | 11/2012 |
| CN | 202616367 U | 12/2012 |
| CN | 202997007 U | 6/2013 |
| CN | 203607513 U | 5/2014 |
| CN | 203800110 U | 8/2014 |
| CN | 203826514 U | 9/2014 |
| CN | 204230382 U | 3/2015 |
| CN | 204230383 U | 3/2015 |
| DE | 102008034885 A1 | 1/2010 |
| EP | 1744360 A2 | 1/2007 |
| EP | 1744360 A3 | 1/2010 |
| JP | 8-273706 A | 10/1996 |
| JP | 8-316389 A | 11/1996 |
| JP | 2007018307 A | 1/2007 |
| JP | 2007180307 A | 7/2007 |
| JP | 2009009889 A | 1/2009 |
| JP | 2012190604 A | 10/2012 |
| JP | 2014128889 A | 7/2014 |
| JP | 2015-106527 A | 6/2015 |
| KR | 1020120021921 A | 3/2012 |
| WO | 2013147240 A1 | 12/2015 |

\* cited by examiner

HEAT SINK AND POWER BATTERY SYSTEM

CROSS-REFERENCE TO RELATED APPLICATIONS

This application is a continuation application of International Application No. PCT/CN2015/091856, filed on Oct. 13, 2015, which is based on and claims priority to and benefits of Chinese Patent Application No. 201420645806.1, filed with the State Intellectual Property Office (SIPO) of the People's Republic of China on Oct. 31, 2014. The entire contents of the above-identified applications are incorporated herein by reference.

TECHNICAL FIELD

The present disclosure relates to a field of power battery, especially relates to a heat sink used in a power battery.

BACKGROUND

A heat sink is used in many fields. Normally, a heat sink includes a plurality of fins in a comb-like pattern, and the fins are capable of increasing a contacting area with a cooling medium.

However, there are some deficiencies in existing heat sink used in a field of power battery system. When the existing heat sink is installed on a battery module, it contacts with a metal shell of the single battery only through an insulting layer. An opening type air duct is formed between the existing heat sink and an inner cavity of the power battery system cabinet, and the existing heat sink in a comb-like pattern has low structural strength. It is easy to deform when being pressed, and cannot withstand the weight and impacting as a bearing component. The fins of the existing heat sink are thick, and the thickness is generally more than 5 mm. A width of the air duct between the fins is more than 10 mm, and the number of the air ducts is also limited. In order to obtain an ideal heat dissipation area, a volume and weight of the heat sink both need to be relatively big. In a field of energy storage battery system and electric vehicle, the battery module has a heavy quality, and thus the existing heat sink cannot withstand the weight and impacting of the battery module, so that cannot be applied in the power battery system. In the existing heat sink, the air duct is opening, the effective utilization rate of the cooling medium is low, and the heat dissipation effect is not so good.

SUMMARY

In order to solve the problems of the existing heat sink in related art (e.g., the heat dissipation effect is not good, the volume thereof is big and cannot bear the weight and the impacting of the battery module), the present disclosure provides a heat sink and a power battery system.

The first aspect of the present disclosure provides a heat sink, which includes a heat dissipation plate and a cover plate. The heat dissipation plate includes a bottom plate and a plurality of fins arranged on the bottom plate in a comb-like pattern. The cover plate is fixedly connected to the heat dissipation plate. The fins of the heat dissipation plate are disposed between the bottom plate and the cover plate. An air duct is formed among the bottom plate, the fins and the cover plate.

In some embodiments, the heat sink of the present disclosure is adapted to be applied in a power battery system. The heat dissipation plate can be formed by a mold, and a thickness of the fins can be further reduced, thus increasing the heat dissipation area of the heat dissipation plate. The heat dissipation area and the heat dissipation effect of the heat sink can be maximized in a limited volume, thus improving a charge and discharge rate of the battery module. The volume of the heat sink is also effectively reduced. Because the cover plate connected with the fins is provided, the force imposed on the heat sink can be distributed to each fin, and thus a structural strength of the heat sink is effectively improved. Under the condition of bearing weight, vibration and shock, the heat sink can be a part of the shell of the power battery system, protecting battery module from being damaged.

In some embodiments, the heat dissipation plate and the cover plate are fixedly connected through at least one of welding, bonding with thermal conductive adhesive, and mechanical fixing. So it can effectively ensure the reliability of the fixed connection between the heat dissipation plate and the cover plate.

In some embodiments, the cover plate includes an inner surface and an outer surface. A plurality of grooves matched with the fins are formed on the inner surface of the cover plate, and free ends of the fins are inserted in the grooves of the cover plate. It is capable of further strengthening the effect of fixed connection adopting above fixed mode.

In some embodiments, a left side and a right side of the bottom plate bend upwards to form lower side surfaces. A left side and a right side of the cover plate bend downwards to form upper side surfaces. The lower side surfaces located on the left and right sides of the heat dissipation plate are connected with the upper side surfaces located on the left and right sides of the cover plate to form a hollow structure. The fins of the heat dissipation plate are disposed in the hollow structure.

In some embodiments, a plurality of thermotubes are arranged on an outer surface of the bottom plate along a longitudinal direction. The thermotubes can ensure the temperature consistency of the air inlet and outlet of the battery module.

In some embodiments, a plurality of semiconductor heating and cooling chips are formed on an outer surface of the bottom plate. The semiconductor heating and cooling chips can be used to adjust the temperature of the single batteries under limit conditions, such as heating the battery under a low temperature, improving air cooling effect under an extreme high temperature.

In some embodiments, an insulating protective coating layer is coated on an outer surface of the bottom plate. In some embodiments, a thickness of the insulating protective layer is 0.05-1 mm.

In some embodiments, a thickness of the fins is 0.8-1.5 mm. In some embodiments, a distance between two adjacent fins is 2-4 mm.

The second aspect of present disclosure provides a power battery system, which includes a battery module and a heat dissipation module. In some embodiment, the heat dissipation module includes the heat sink as mentioned above.

The power battery system having the aforementioned heat sink has high heat dissipation efficiency, a charge and discharge rate of the battery module is improved, and a volume of the heat sink is reduced. Because a cover plate is added in the heat sink, the force imposed on the heat sink can be distributed to each fin, and thus the structural strength of the heat sink is effectively improved. Under the condition of bearing weight, vibration and shock, the heat sink can be a part of a shell of the power battery system, and thus can protect battery module from being damaged.

In some embodiments, the battery module includes a frame and a plurality of single batteries disposed in the frame. The battery module includes an upper surface, a lower surface, a left side surface, a right side surface, a front end surface and a back end surface. The heat dissipation module includes an upper heat sink and an lower heat sink. The upper heat sink is disposed on the upper surface of the battery module, and the lower heat sink is disposed on the lower surface of the battery module.

In some embodiments, the heat dissipation module includes a protective cover disposed on the front end surface, and a cooling fan is disposed on the protective cover.

In some embodiments, the frame includes two side frames located on the left and right sides of the battery module and two end frames located on the front and back ends of the battery module. The side frames and the end frames are formed as a rectangle. The single batteries are transversely arranged between the two side frames, and the electrode terminals of the single batteries extend into the side frames.

In some embodiments, the heat dissipation module also includes a left air duct cover and a right air duct cover. The left air duct cover and the right air duct cover are disposed on the outside of the side frames. A left air duct is formed between the left air duct cover and the side frames, and a right air duct is formed between the right air duct cover and the side frames.

In some embodiments, the side frames are formed by splicing a plurality of splicing units.

In some embodiments, a buckle male end and a buckle female end are formed on every splicing unit. The buckle male end and the buckle female end of the adjacent splicing units are connected with each other by a buckle connection.

In some embodiments, a bolt and a socket are disposed on every splicing unit. The bolt and the socket of the adjacent splicing units are connected with each other.

In some embodiments, the splicing unit is of central symmetry.

In some embodiments, the single battery is coated with an insulating protective film. A heat conduction insulating layer is disposed between the upper heat sink and the upper surface of the battery module, and also disposed between the lower heat sink and the lower surface of the battery module.

REFERENCE NUMERALS

1: heat sink, 1a: upper heat sink, 1b: lower heat sink;
11: cover plate, 111: top plate, 112: upper side surface, 11a: groove;
12: heat dissipation plate, 120: bottom plate, 121: lower side surface, 122: avoiding notch, 12a: fin, 12c: thermotube, 12d: semiconductor heating and cooling chips;
13: insulating protective coating layer;
2: battery module, 2a: the first electrode, 2b: the second electrode, 2c: insulating protective film, 2d: heat conduction insulating layer;
20: single battery, 21: end frame, 22: side frame, 220: splicing unit;
3: fan protective cover, 31: cooling fan;
4: left air duct cover, 41: left air inlet;
5: right air duct cover, 51: right air inlet;
a: buckle male end, b: buckle female end, c: bolt, d: socket, a1: buckle groove, b1: buckle block.

DETAILED DESCRIPTION

With reference to the following descriptions and drawings, these and other aspects of embodiments of the present disclosure will become apparent. In the descriptions and drawings, some particular embodiments are described in order to show the principles of embodiments according to the present disclosure, however, it should be appreciated that the scope of embodiments according to the present disclosure is not limited herein. On the contrary, changes, alternatives, and modifications can be made in the embodiments without departing from spirit, principles and scope of the attached claims.

EXAMPLE 1

Figure 1:
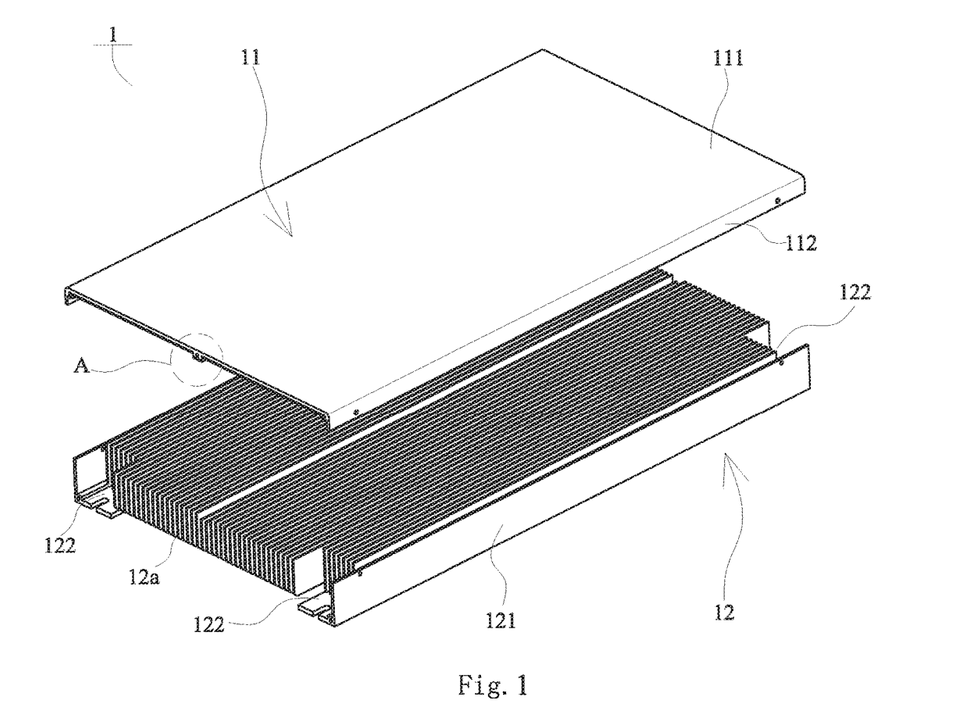
FIG. 1 is an exploded stereo diagram of the heat sink provided by embodiments of the present disclosure.
Figure 2:
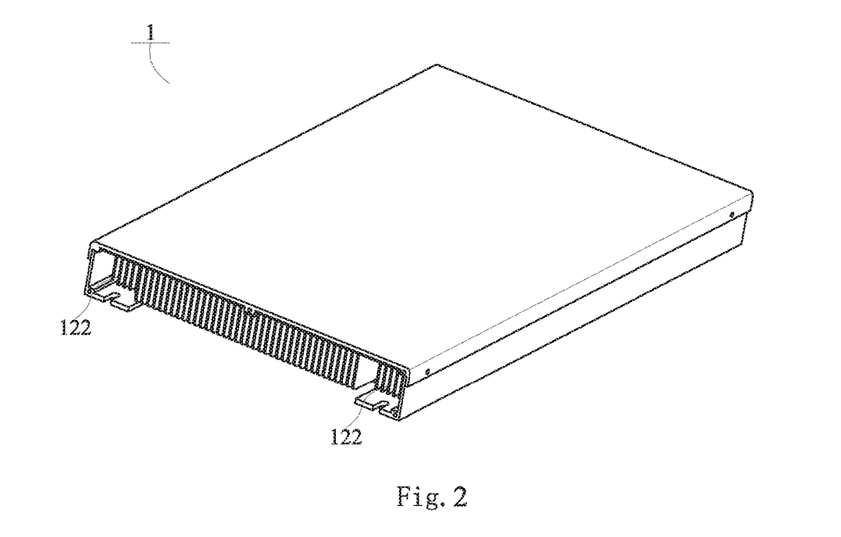
FIG. 2 is a stereo diagram of the heat sink provided by embodiments of the present disclosure.

The embodiment is used to specifically illustrate the heat sink 1 of the present disclosure. As shown in FIG. 1 and FIG. 2, the heat sink 1 includes a heat dissipation plate 12 and a cover plate 11, and the heat dissipation plate 12 includes a bottom plate 120 and a plurality of fins 12a arranged on the bottom plate 120 in a comb-like pattern. The cover plate 11 is fixedly connected to the heat dissipation plate 12, and the fins 12a of the heat dissipation plate 12 are disposed between the bottom plate 120 and the cover plate 11. An air duct is formed among the bottom plate 120, the fins 12a, and the cover plate 11.

The cooling medium may flow through the air duct, so that the cooling medium can exchange the heat with the heat sink 1.

Several fixedly connecting modes may be used between the cover plate 11 and the heat dissipation plate 12. For example, the heat dissipation plate 12 and the cover plate 11 are fixedly connected through at least one of welding, bonding with thermal conductive adhesive and mechanical fixing. The welding mode can be, but not limited to, brazing, polymer diffusion welding and so on. Bonding with thermal conductive adhesive can adopt all kinds of thermal bonding materials meeting the requirements of thermal conductivity, bonding strength, ageing-resistant performance and so on, such as a thermal silicone. The mechanical fixing mode can be one of screw connection, rivet connection, and interference fit and so on. Aforementioned three fixing modes can be used alone or in combination, so as to guarantee the fixing connection reliability between the heat dissipation plate 12 and the cover plate 11.

In an embodiment, a thickness of the fins is 0.8-1.5 mm, a width of an air duct that is a distance between two adjacent fins is 2-4 mm, and a height-width ratio of the fins 12a can be about 25:1. Under a condition when the windage resistance meets certain requirements, the heat dissipation area of the fins 12a is maximized. The heat sink plate 1 has a hollow structure with high density of the fins, achieving maximum heat dissipation effect in a limited space.

Generally the overall size of the heat sink 1 is not limited, for example, a thickness of the heat sink 1 is about 30-60 mm, and a length and width of the heat sink 1 are defined depending on the size of the battery module 2.

After understanding the technical scheme of the present disclosure, the skilled person in this field can improve the heat dissipation efficiency to a maximum in a limited space through reasonably designing the shape of the heat sink 1 as well as the size of the fins 12a and the air duct, and no need for inventive labor.

Figure 3:
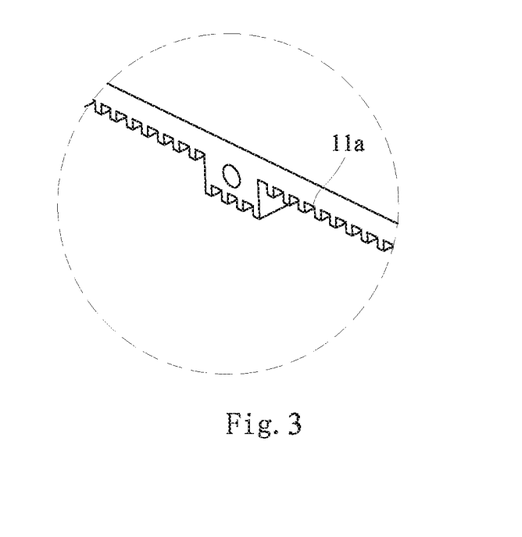
FIG. 3 is a magnified diagram of the part A in FIG. 1.
Figure 4:
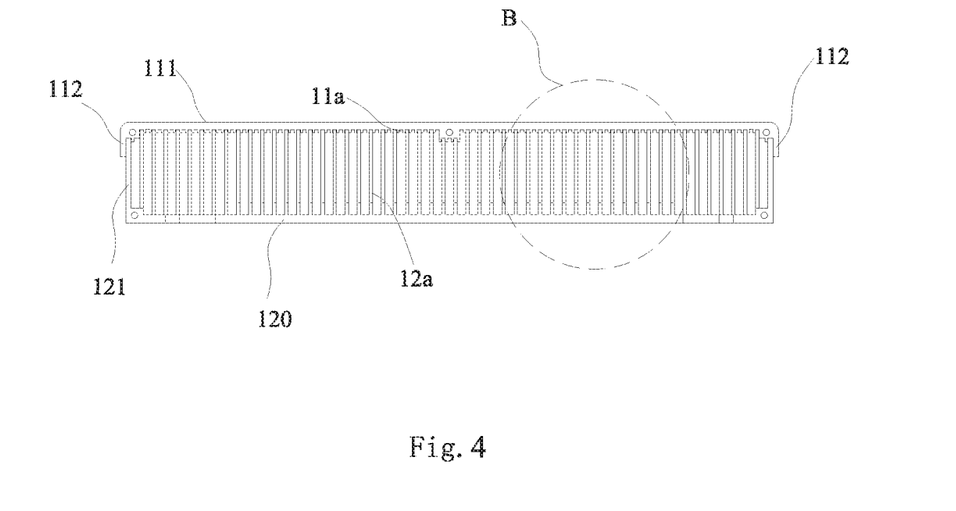
FIG. 4 is a front view of the heat sink provided by embodiments of the present disclosure.
Figure 5:
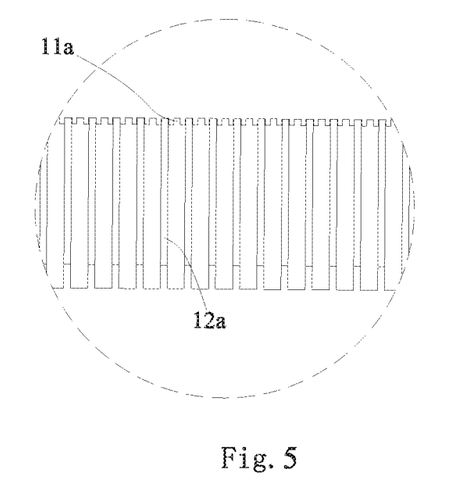
FIG. 5 is a magnified diagram of part B in FIG. 4.

In order to further improve the connection strength, in some embodiments, as shown in FIG. 3 to FIG. 5, the cover plate 11 includes an inner surface and an outer surface, and a plurality of grooves 11a are formed on the inner surface of the cover plate 11 and matched with the fins 12a.

Free ends of the fins 12a are inserted in the grooves of the cover plate. The ends of the fins 12a connected with the bottom plate 120 are the fixed ends, while the ends opposite to the fixed ends are the free ends.

Adopting the fixed mode of the grooves 11a connecting with the fins 12a, the fixed connecting effect between the heat dissipation plate 12 and the cover plate 11 can be further improved. When the fins 12a are inserted in the grooves 11a, optionally they are further bonded with thermal conductive adhesive. The grooves 11a are good for improving the adhesion of thermal conductive adhesive, so as to further improve the bonding reliability between the cover plate 11 and the fins 12a.

In some embodiments of the present disclosure, as shown in FIG. 1, FIG. 2 and FIG. 4, a left side and a right side of the bottom plate 120 of the heat dissipation plate 12 bend upwards, and forming two lower side surfaces 121. The lower side surfaces 121 is a part of the bottom plate 120, and the whole heat dissipation plate 12 is formed integrally. The bottom plate 120 includes a flat plate and two lower side surfaces 121 bending upwards from the two sides of the flat plate.

A left side and a right side of the cover plate bend downwards, forming two upper side surfaces 112 at two sides thereof. The upper side surfaces 112 are a part of the cover plate 11, and the cover plate 11 is an integral part. As shown in FIG. 1 and FIG. 2, the cover plate 11 includes a flat plate and two upper side surfaces 112 bending downwards from the two sides of the flat plate. In order to distinguish the flat plate of the bottom 120 from the flat plate of the cover plate 11, the flat plate of the cover plate 11 is referred to as a top plate 111, and the aforementioned two upper side surfaces 112 are located on two sides of the top plate 111.

The lower side surfaces 121 located on the left and right sides of the heat dissipation plate 12 are connected with the upper side surfaces 112 located on the left and right sides of the cover plate 11 to form a hollow structure. The fins 12a of the heat dissipation plate 12 are disposed in the hollow structure.

As shown in FIG. 1 and FIG. 2, avoiding notches 122 used to cooperate with the battery module 2 are formed at four corners of the heat dissipation plate 12.

Figure 6:
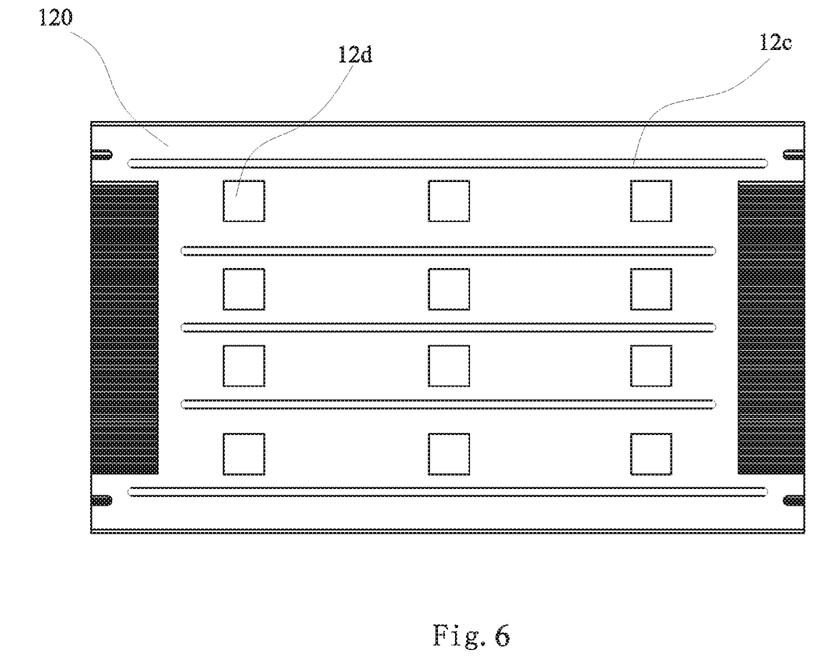
FIG. 6 is a diagram of the heat sink provided by embodiments of the present disclosure.

As shown in FIG. 6, in order to further improve the heat dissipation effect, in some embodiments, a plurality of thermotubes 12c are formed on an outer surface of the bottom plate 120 of the heat dissipation plate 12 along a longitudinal direction. The temperature consistency of the air inlet and outlet of the battery module 2 is realized, specifically, a plurality of the thermotubes 12c extend along left and right directions of the FIG. 6, and disposed parallel to each other on the outer surface of the bottom plate 120 of the heat dissipation plate 12.

In order to further improve the heat dissipation effect and regulate the temperature under extreme conditions of the single battery 20 in assist, such as heating the battery module under low temperature condition, or enhanced air cooling function under extreme high temperature condition. As shown in FIG. 6, a plurality of semiconductor heating and cooling chips 12d can be arranged on the outer surface of the bottom plate 120 of the heat dissipation plate 12. The aforementioned semiconductor heating and cooling chips 12d are well known by the skilled person in this field, in some embodiments, they are arranged in an array distribution mode on the outer surface of the bottom plate 120. The arrangement can be adjusted according to the temperature distribution of the battery module. The power of the semiconductor heating and cooling chips 12d can be supplied by a single battery 20, or can be supplied by an auxiliary power of BMS (BATTERY MANAGEMENT SYSTEM). The semiconductor heating and cooling chips can be controlled to start or stop, and the power for cooling or heating by BMS can be controlled.

Figure 9:
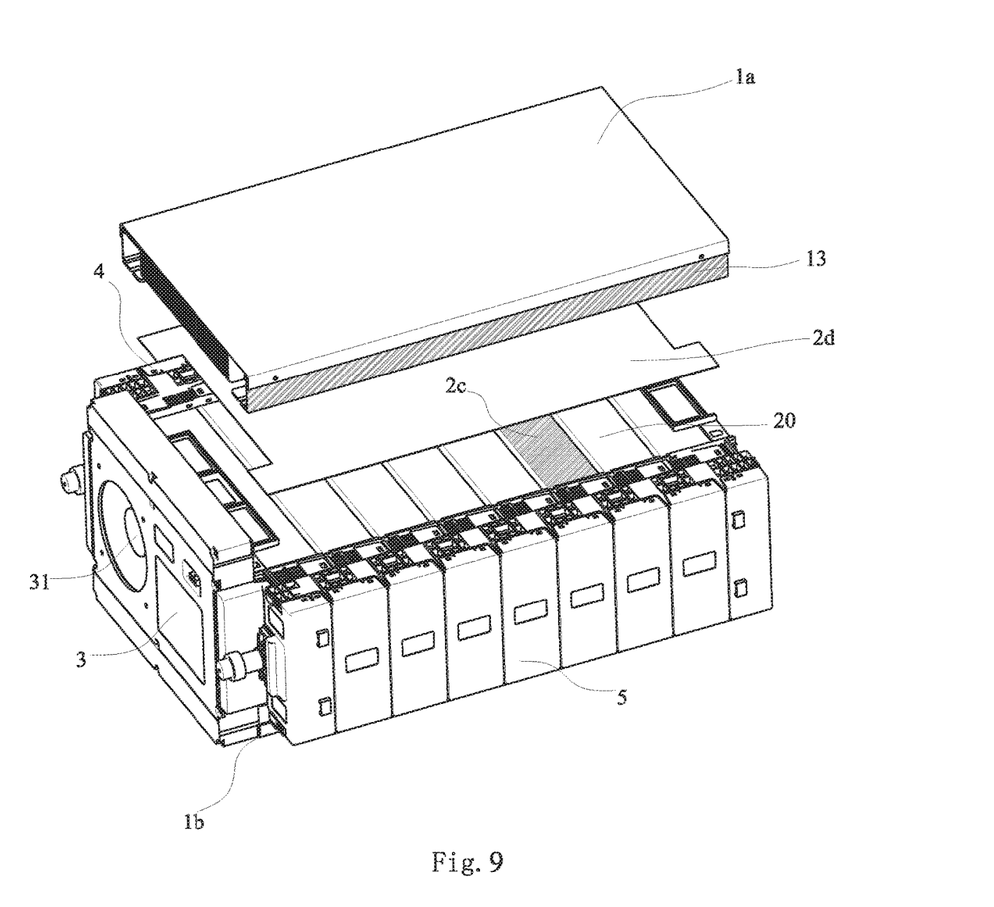
FIG. 9 is an exploded stereo diagram of a power battery system provided by embodiments of the present disclosure.

In some embodiments of the present disclosure, as shown in FIG. 9, an insulating protective coating layer 13 is coated on the back of the bottom plate 120 of the heat sink 1. A thickness of the insulating protective layer is 0.05-1 mm, preferably as 0.1-0.5 mm. The insulating protective coating layer 13 can be a sintered ceramic layer, a spraying layer of thermal insulation adhesive (thermal spraying or normal temperature spraying), and/or a thermal insulation adhesive immersion, etc. In this embodiment, the bottom plate 120 includes the lower side surfaces 121 bended upwards from two sides of the bottom plate, thus the back of the bottom plate 120 also includes the back of the lower side surfaces 121. The surface of the bottom plate 120 connected with the fins 12a is an inner surface, while the other surface of the bottom plate 120 opposite to the inner surface is the outer surface, also known as the back of the bottom plate 120. Because the back of the bottom plate 120 of the heat dissipation plate 12 may be connected with the shell of the single battery 20, the phenomenon of short circuit or leakage of electricity is easy to appear. Thus the back of the bottom plate 120 can be formed with a sintered ceramic layer through ceramic spraying and sintering process, or can be formed with an insulating protective coating layer 13 having high thermal conductivity, high strength (such as a good performance of wear-resisting, adhesive force, impact strength, aging resistance and so on) through a process of thermal insulation adhesive spraying (thermal spraying or normal temperature spraying) or a process of thermal insulation adhesive immersion Therefore, a reliable enough insulation performance between the heat sink 1 and the shell of the single batteries 20 can be guaranteed, and thus minimizing thermal resistance, improving heat dissipation efficiency, effectively avoiding a risk of leakage of the battery module 2 and short circuit of the heat sink 1, and improving the reliability of power battery system. Preferably, a thickness of the insulating protective coating layer is 0.2-1 mm, the thermal conductivity thereof is more than 4 w/mK, and a withstand voltage thereof is more than AC5000V.

When the aforementioned heat sink 1 of this embodiment is applied in a power battery system, the heat dissipation plate 12 can be formed by a mold, and a thickness of the fins 12a can be further reduced, thus increasing the heat dissipation area of the heat dissipation plate 12. An inner part of the heat sink 1 can be formed as a hollow structure with high density of fins, and the heat dissipation efficiency is improved. The heat dissipation area and the heat dissipation effect of the heat sink 1 are maximized in a limited volume, so as to improve a charge and discharge rate of the battery module 2, and the volume of the heat sink 1 is also effectively reduced. Because the cover plate 11 is provided, the force imposed on the heat sink 1 can be distributed to each fin 12a, and thus the whole structural strength of the heat sink 1 is effectively improved. Under the condition of bearing weight, vibration, and shock, the heat sink 1 can be a part of a shell of the power battery system, protecting battery module 2 from being damaged.

EXAMPLE 2

The following will illustrate the power battery system in an embodiment of the present disclosure, which includes battery module 2 and a heat dissipation module. The heat dissipation module includes the heat sink 1 as described in Example 1.

Specifically, the battery module 2 includes a frame and a plurality of single batteries 20 disposed in the frame. The battery module 2 includes an upper surface, a lower surface, a left side surface, a right side surface, a front end surface, and a back end surface. The upper surface and the lower surface of the battery module 2 are respectively provided with a heat sink 1, referred to as an upper heat sink 1a and a lower heat sink 1b respectively. The heat dissipation module also includes a protective cover 3 disposed on the front end surface of the battery module 2, and a cooling fan 31 is disposed on the protective cover 3.

In order to improve the heat dissipation efficiency, the material of the heat sink 1 is made of a metal, such as a type AL6061 or AL6063 of aluminum alloy, or copper.

Optionally, the aforementioned single battery 20 can be a lithium ion battery, furtherly, can be a lithium iron phosphate battery.

The air duct of the upper heat sink 1a is connected with the air duct of the lower heat sink 1b through a inter part of the fan protective cover 3. The cooling medium can flow from the air duct of the upper heat sink 1a to the air duct of the lower heat sink 1b.

Figure 7:
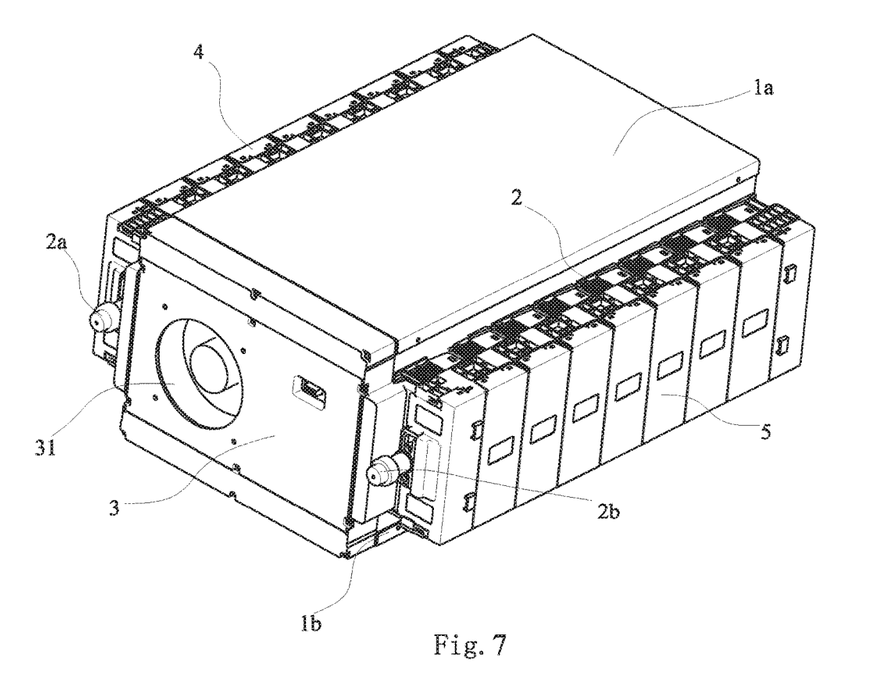
FIG. 7 is a stereo diagram of a power battery system provided by embodiments of the present disclosure.

As shown in FIG. 7, the fan protective cover 3 is mounted on the front end surface of the battery module 2. A surface opposite to the front end surface is the back end surface, an upper surface of the battery module 2 in FIG. 7 is the upper surface, a surface opposite to the upper surface is the lower surface, a left surface of the front end surface of the battery module 2 is the left side surface, and a right surface of the front end surface of the battery module 2 is the right side surface.

The aforementioned upper heat sink 1a and lower heat sink 1b can take away the heat generated by the single batteries 20 of the battery module 2. The cooling fan 31 drives the air to form a heat exchange in the heat sink 1, and the main part of the heat generated by the single batteries 20 can be dispersed out, providing a good effect of cooling.

The single battery 20 has electrode terminals, for example a positive terminal and a negative terminal. The electrode terminals also generate a lot of heat during working, and this part of the heat needs to be released. Thus the cooling air ducts can be formed on the left and right sides of the battery module 2, and the electrode terminals are disposed in at least one of the left air duct and the right air duct. The left and right air ducts depend on the location of the electrode terminals. As shown in FIG. 7, a plurality of single batteries 20 are connected in series, or in parallel, or in series and parallel, the electrode terminals of the single batteries 20 are connected with an electrode connecting piece, and a first electrode 2a and a second electrode 2b of the battery module 2 extend out from at least one side of the fan protective cover 3. The first electrode 2a is a positive electrode, and the second electrode 2b is a negative electrode. Or alternatively, the first electrode 2a is a negative electrode, and the second electrode 2b is a positive electrode.

Figure 8:
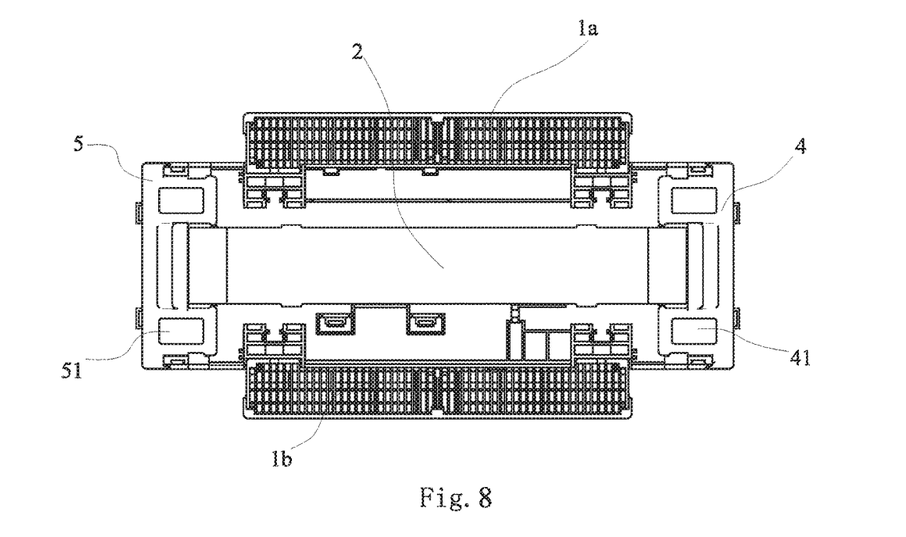
FIG. 8 is a rear view of a power battery system provided by embodiments of the present disclosure.

As shown in FIG. 8, a flow direction of the cooling medium (such as wind) is not limited, which depends on the operative mode of the cooling fan 31. The wind can be supplied into the battery module 2. Or alternatively a negative pressure can be formed in the battery module 2 through the turning direction of the cooling fan 31, and the cooling medium is sucked into the air duct for heat exchange through an air inlet disposed on the back end surface of the battery module 2. For example, a left air inlet 41 is formed on the left air duct cover 4, and a right air inlet 51 is formed on the right air duct cover 5. An upper air inlet is formed on the back of the upper heat sink 1a, and a lower air inlet is formed on the back of the lower heat sink 1b.

As shown in FIG. 9, the single battery 20 is covered by an insulation protective film 2c. A heat conducting insulating layer 2d is arranged both between the upper heat sink 1a and the upper surface of the battery module 2, and between the lower heat sink 1b and the lower surface of the battery module 2.

As mentioned above, three insulation structures are disposed between the heat sink 1 and the single battery module 20, for example the insulation protective film 2c coated on the outside of the single battery module 20, the heat conduction insulating layer 2d disposed between the heat sink 1 and the battery module 2, and the insulating protective coating layer 13 disposed on the back of the bottom plate 120 of the heat sink 1. The withstand voltage of each insulation structure is more than AC5000V, maximum protection of battery module 2 can be realized.

Figure 10:
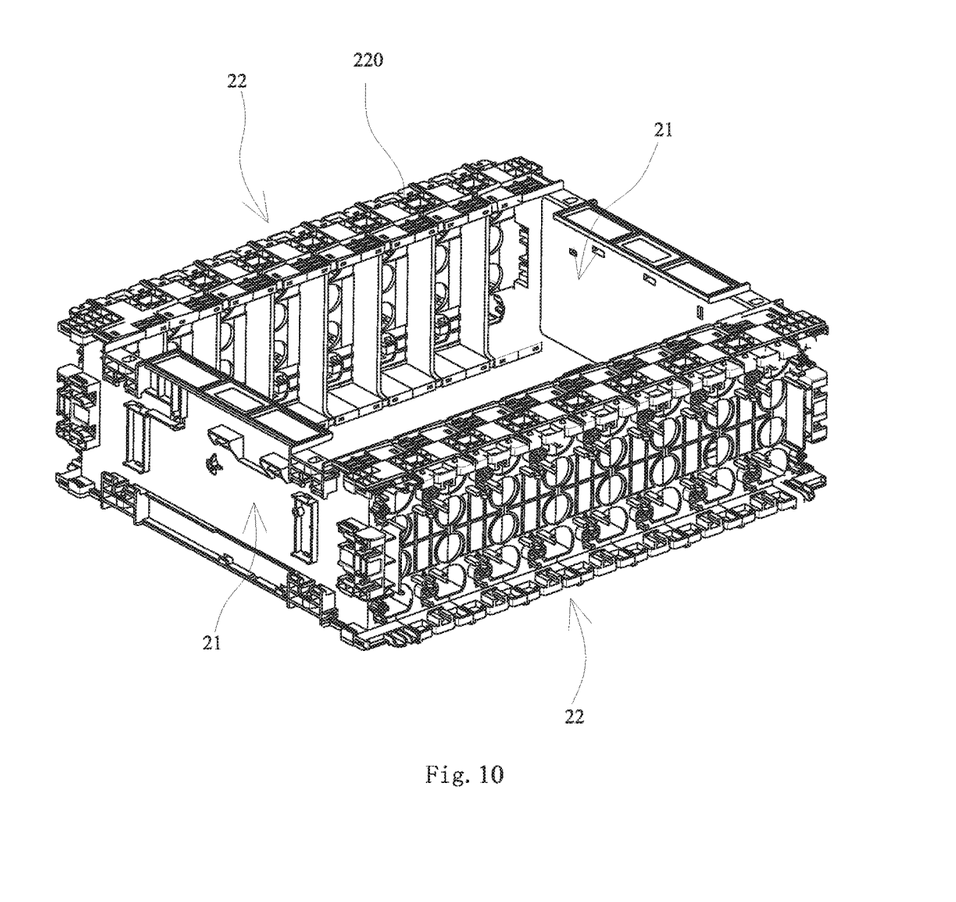
FIG. 10 is a stereo diagram of a frame provided by embodiments of the present disclosure.

As shown in FIG. 10, the frame includes two side frames 22 disposed on the left and right side surface of the battery module 2, and two end frames 21 disposed on the front and back end surface of the battery module 2. The side frames 22 and the end frames 21 connect with each other and form as a rectangle. The single battery 20 is transversely arranged between the two side frames 22, and the electrode terminals of the single battery extend into the side frames 22.

As shown in FIG. 7, the heat dissipation module also includes a left air duct cover 4 and a right air duct cover 5. The left air duct cover 4 and the right air duct cover 5 are disposed on the outside of the two side frames. A left air duct is formed between the left air duct cover and the side frames 22, and a right air duct is formed between the right air duct cover and the side frames 22.

Figure 11:
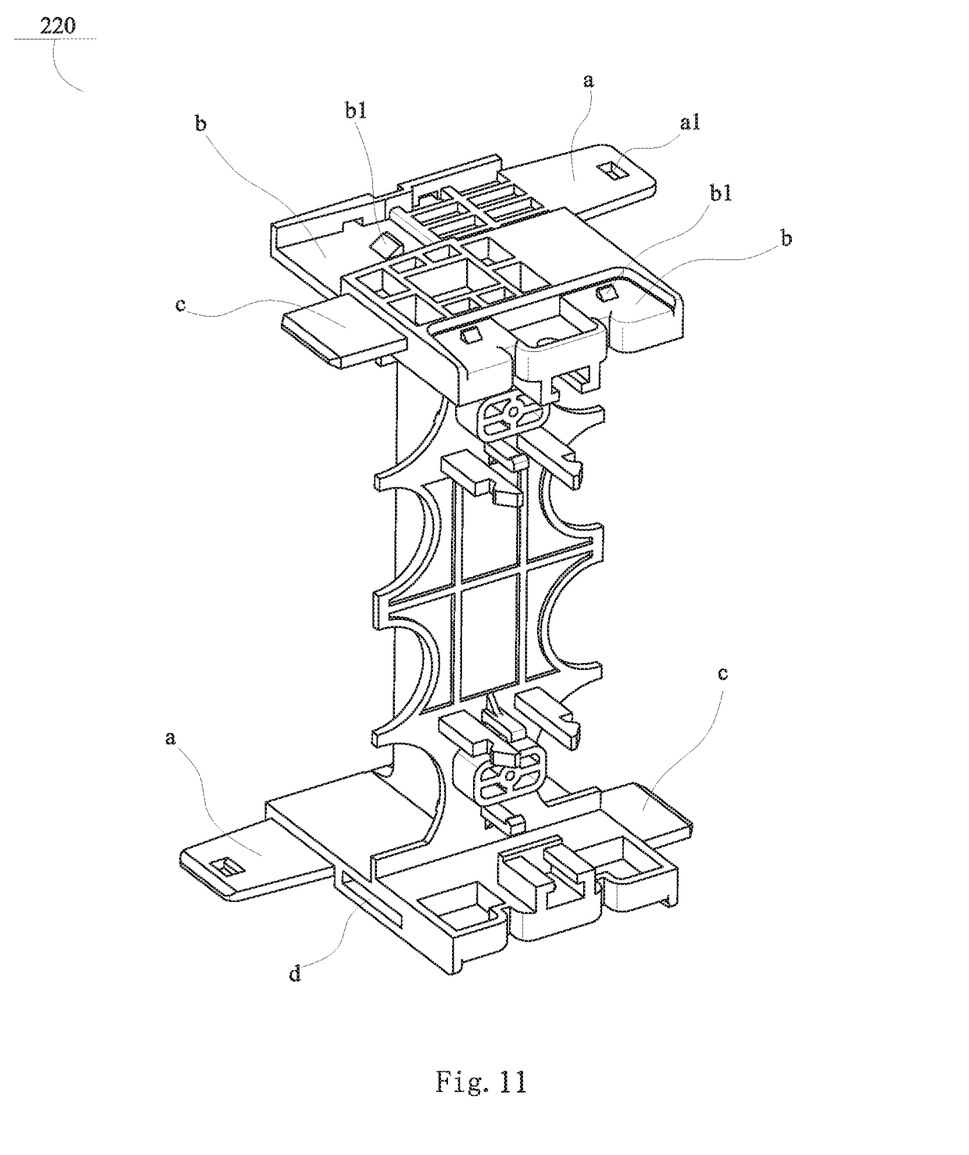
FIG. 11 is a stereo diagram of a splicing unit provided by embodiments of the present disclosure.

Specifically, as shown in FIG. 10 and FIG. 11, the side frames 22 are formed by splicing a plurality of splicing units 220. A buckle male end a and a buckle female end b are formed on the splicing unit 220, and the buckle male end a and the buckle female end b of the adjacent splicing units are connected with each other by the buckle connection. A bolt c and a socket d are disposed on the splicing unit 220, and the bolt c and the socket d of the adjacent splicing units are connected with each other. The bolt c and slot d mainly play a role of positioning and preventing rotation.

The side frame 22 is formed by a plurality of splicing units 220. The number of the splicing unit 220 in the side frame is not limited, thus different sizes of side frame 22 can be formed in the case of not changing the mold and without adding structural parts.

Figure 13:
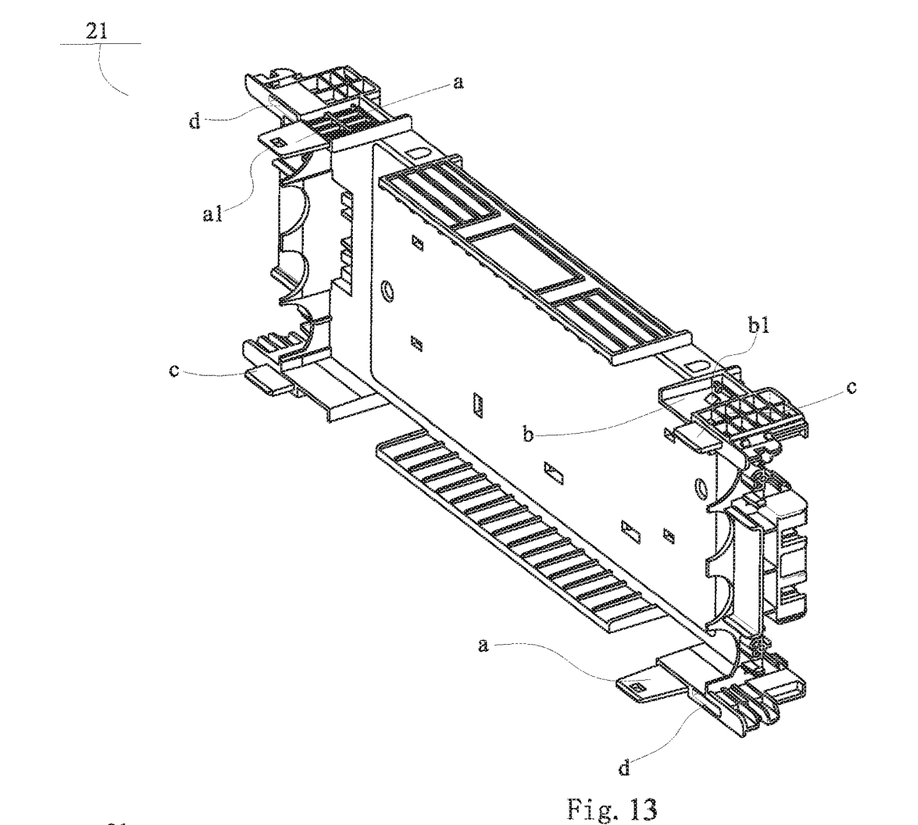
FIG. 13 is a stereo diagram of an end frame provided by embodiments of the present disclosure.

Specifically, as shown in FIG. 13, a buckle male end a, a buckle female end b, a bolt c and a socket d are also disposed on the end frame 21. The buckle male end a of the end frame 21 is connected with the buckle female end b of the splicing unit 220, and the buckle female end b of the end frame 21 is connected with the male end a of the splicing unit 220. The bolt c of the end frame 21 is connected with the socket d of the splicing unit 220, and the socket d of the end frame 21 is connected with the bolt c of the splicing unit 220.

Adopting the aforementioned end frames 21 and the side frames 22 formed by splicing several splicing units 220, all parts can be assembled together by buckle connection and inserting connection, finally tightening the side frame 22 and the end frame 21 with a tie, so the single batteries can be securely fixed together.

In order to further strengthen the effect of buckle connection, a buckle groove a1 can be formed on the buckle male end a, and a block b1 can be formed on the buckle female end b. The buckle groove a1 is cooperated with the block b1.

Figure 12:
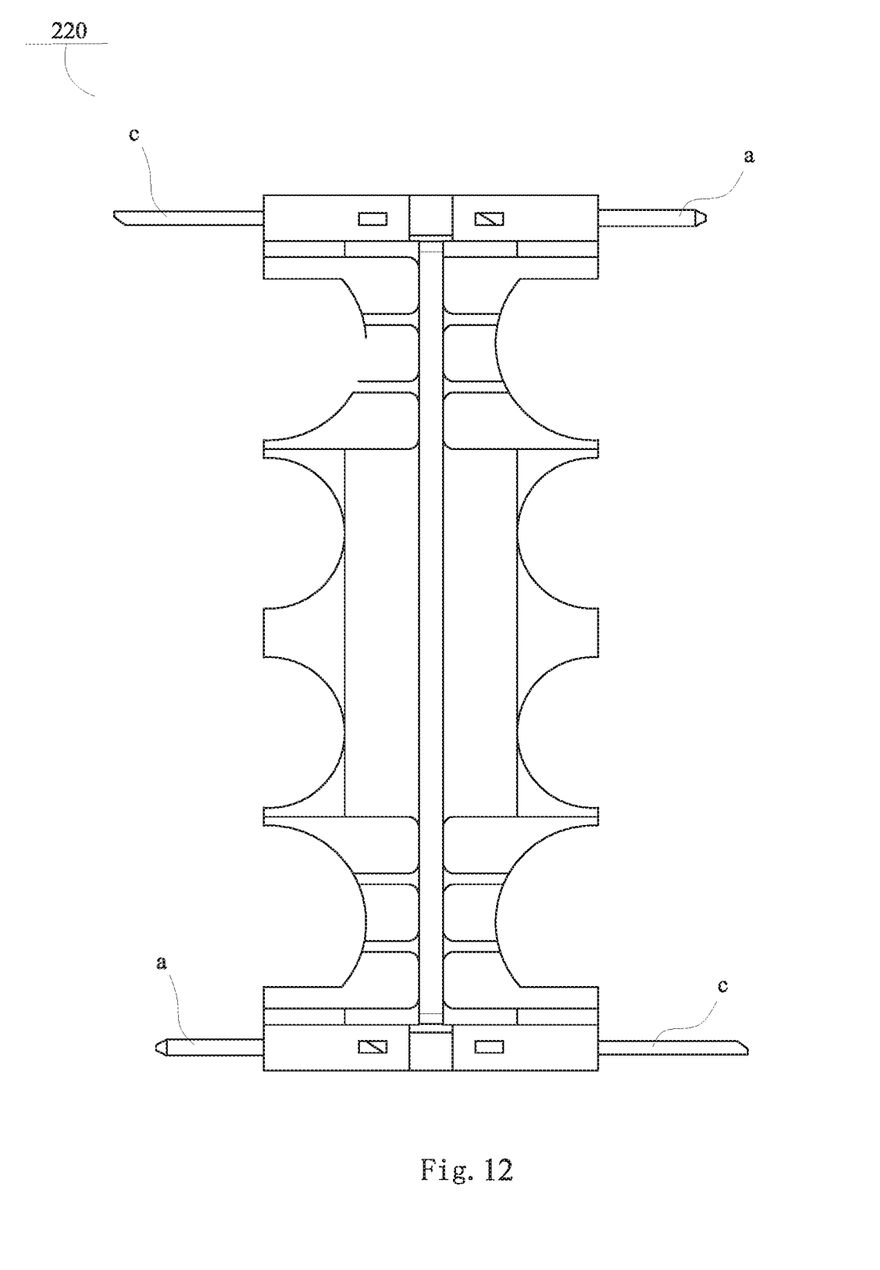
FIG. 12 is a diagram of the splicing unit provided by embodiments of the present disclosure.
Figure 14:
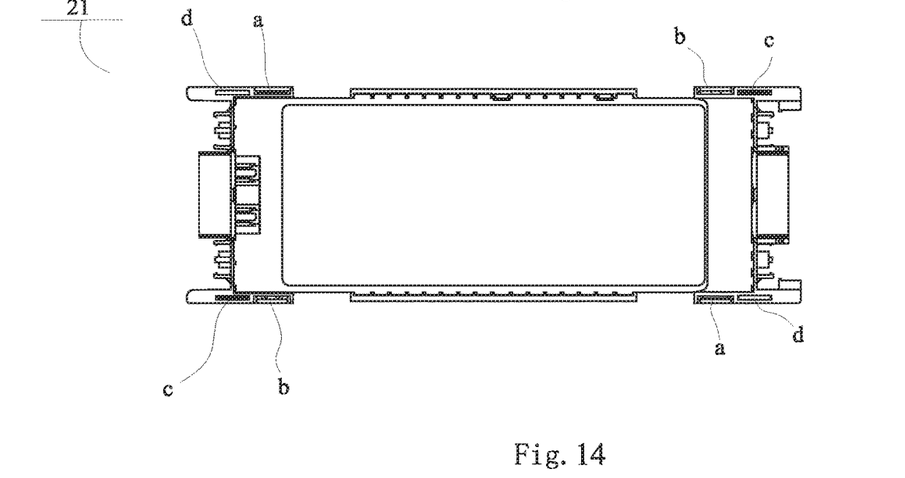
FIG. 14 is a diagram of the end frame provided by embodiments of the present disclosure.

As shown in FIG. 12, the splicing unit 220 is of central symmetry. As shown in FIG. 14, the end frame 21 is also of central symmetry. The side frame 22 and the end frame 21 are both in a central symmetry structure, and the structure can reduce the number of main structure parts to the minimum, and has a strong interchangeability. Every fitting surface, both between the side frame 22 and the end frame 21 and between two adjacent splicing unit 220 in the side frame 21, has a pair of buckle fixing structure (e.g., the buckle male end a and the buckle female end b) and a pair of anti-rotation structure of positioning pin (e.g., the bolt and the socket). A fixed mode of four point positioning is formed, thus avoiding the battery module to fall apart during transportation and turnover.

The following will describe working process of the heat dissipation module.

As shown in FIG. 8, the cooling fan 31 is spinning in a high speed and forming a negative pressure in the fan protective cover 3, and thus the pressure difference between the fan protective cover 3 and the air inlet make external cold air get into from the four air ducts inlets. The cold air respectively flows through the air duct of the upper heat sink 1a and the lower heat sink 1b, and the left side air duct and the right side air duct. The cooling medium in the left side air duct and the right side air duct exchange heat with the electrode connecting piece, whilst the metal shell of the single batteries 20 exchange heat with the cooling medium in the air duct of the heat sink 1, thus achieving an adequate heat exchange effect. Thus a temperature of a sampling point of the electrode connecting piece is close to a real temperature of the single battery 20, so as to ensure the validity of temperature data.

Under the same test conditions, through contrast the power battery system having the heat dissipation module and having no heat dissipation module, under the environment of constant temperature of 23° C., when the power battery system of 200 A having no heat dissipation module is in an uninterrupted cycle of 1C, a maximum value of equilibrium temperature is 58° C. The power battery system of 200A having heat dissipation module is in an uninterrupted cycle of 2C, and a maximum value of equilibrium temperature is 48° C., and a maximum value of equilibrium temperature in an uninterrupted cycle of 2.5C is 55° C. A charge and discharge rate can be increased more than doubled, up to 2.5 magnification, and the maximum temperature of the single battery 20 can be maintained at 40° C. under working condition of 4C frequency modulation, and at the same time, the module has better temperature consistency. Therefore, the heat dissipation module can be directly applied to the field of high power frequency modulation power station, ensuring that the battery operates in a controlled temperature range, and improving the service life of energy storage system.

The power battery system having the aforementioned heat sink 1 has high heat dissipation efficiency, thus improving the charge and discharge rate of the battery module 2, and the volume of the heat sink 1 is reduced. Due to the cover plate 11 was added in the heat sink 1, the force can be distributed to each fin 12a, and thus the structural strength of the heat sink 1 is effectively improved. Under the condition of bearing weight, vibration and shock, the heat sink 1 can be part of a shell of the power battery system, protecting battery module from being damaged.

Although preferable embodiments of the present disclosure have been described in detail in above, the present disclosure is not limited to specific details in the foregoing embodiments. Various simple variations can be made within the scope of the technical idea of the present disclosure, and such simple variations all fall within the protection scope of the present disclosure.

The invention claimed is:

1. A heat sink, comprising: a heat dissipation plate and a cover plate, wherein,
    the heat dissipation plate comprises a bottom plate and a plurality of fins on the bottom plate such that a cross-section of the heat dissipation plate has a comb pattern;
    the cover plate is fixedly connected to the heat dissipation plate, and includes an inner surface facing the fins and a rib portion protruding from the inner surface, wherein the rib portion and the inner surface include grooves for receiving the fins, wherein a groove on the rib portion receives a first fin having a first height and a groove on the inner surface receives a second fin having a second height greater than the first height;
    the fins of the heat dissipation plate are disposed between the bottom plate and the cover plate; and
    an air duct is formed among the bottom plate, the fins and the cover plate.

2. The heat sink according to claim 1, wherein the heat dissipation plate and the cover plate is fixedly connected through at least one of welding, bonding with thermal conductive adhesive, and mechanical fixing.

3. The heat sink according to claim 1, wherein free ends of the fins are inserted in the grooves of the cover plate.

4. The heat sink according to claim 1, wherein, a left side and a right side of the bottom plate bend upwards to form lower side surfaces; a left side and a right side of the cover plate bend downwards to form upper side surfaces; the lower side surfaces located on the left and right sides of the heat dissipation plate are connected with the upper side surfaces located on the left and right sides of the cover plate to form a hollow structure; and the fins of the heat dissipation plate are disposed in the hollow structure.

5. The heat sink according to claim 1, wherein a plurality of thermotubes are formed on an outer surface of the bottom plate along a longitudinal direction.

6. The heat sink according to claim 1, wherein a plurality of semiconductor heating and cooling chips are formed on an outer surface of the bottom plate.

7. The heat sink according to claim 1, wherein an insulating protective coating layer is coated on an outer surface of the bottom plate.

8. The heat sink according to claim 7, wherein a thickness of the insulating protective coating layer is 0.05-1 mm.

9. The heat sink according to claim 1, wherein a thickness of the fins is 0.8-1.5 mm, and a distance between two adjacent fins is 2-4 mm.

10. A power battery system, comprising a battery module and a heat dissipation module, wherein the heat dissipation module comprises a heat sink that comprises a heat dissipation plate and a cover plate; wherein the heat dissipation plate comprises a bottom plate and a plurality of fins arranged on the bottom plate such that a cross-section of the heat dissipation plate has a comb pattern; the cover plate is fixedly connected to the heat dissipation plate, and includes an inner surface facing the fins and a rib portion protruding from the inner surface, wherein the rib portion and the inner surface include grooves for receiving the fins, wherein a groove on the rib portion receives a first fin having a first height and a groove on the inner surface receives a second fin having a second height greater than the first height; the fins of the heat dissipation plate are disposed between the bottom plate and the cover plate; and an air duct is formed among the bottom plate, the fins and the cover plate.

11. The power battery system according to claim 10, wherein, the battery module comprises a frame and a plurality of single batteries disposed in the frame, and
the battery module has an upper surface, a lower surface, a left side surface, a right side surface, a front end surface and a back end surface; and
wherein the heat dissipation module comprises an upper heat sink and an lower heat sink, the upper heat sink is disposed on the upper surface of the battery module, and the lower heat sink is disposed on the lower surface of the battery module.

12. The power battery system according to claim 10, wherein the heat dissipation module also comprises a protective cover disposed on the front end surface of the battery module, and a cooling fan is disposed on the protective cover.

13. The power battery system according to claim 11, wherein, the frame comprises two side frames located on the left and right sides of the battery module, and two end frames located on the front and back ends of the battery module; the side frames and the end frames connected with each other are formed as a rectangle; and the single batteries are transversely arranged between the two side frames, the electrode terminals of the single batteries extend into the side frames.

14. The power battery system according to claim 13, wherein, the heat dissipation module also comprises a left air duct cover and a right air duct cover; the left air duct cover and the right air duct cover are disposed on the outside of the two side frames, a left air duct is formed between the left air duct cover and the side frames, and a right air duct is formed between the right air duct cover and the side frames.

15. The power battery system according to claim 13, wherein the side frames are formed by splicing a plurality of splicing units.

16. The power battery system according to claim 15, wherein, a buckle male end and a buckle female end are formed on every splicing unit, and the buckle male end and the buckle female end of the adjacent splicing units are connected with each other by a buckle connection.

17. The power battery system according to claim 16, wherein, a bolt and a socket are disposed on every splicing unit, and the bolt and the socket of the adjacent splicing units are connected with each other.

18. The power battery system according to claim 17, wherein the splicing unit is of central symmetry.

19. The power battery system according to claim 11, wherein the single battery is coated with an insulating protective film.

20. The power battery system according to claim 11, wherein, a heat conduction insulating layer is disposed between the upper heat sink and the upper surface of the battery module, and also disposed between the lower heat sink and the lower surface of the battery module.

* * * * *